United States Patent
Hagihara et al.

(10) Patent No.: US 6,918,938 B2
(45) Date of Patent: Jul. 19, 2005

(54) POLISHING COMPOSITION

(75) Inventors: Toshiya Hagihara, Wakayama (JP); Shigeo Fujii, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/689,085

(22) Filed: Oct. 21, 2003

(65) Prior Publication Data

US 2004/0083656 A1 May 6, 2004

(30) Foreign Application Priority Data

Oct. 30, 2002 (JP) ........................................ 2002-316224

(51) Int. Cl.⁷ ................................................ B24B 1/00
(52) U.S. Cl. ............................. 51/307; 51/308; 51/309; 106/3; 510/369; 510/165; 510/167; 216/96
(58) Field of Search .......................... 51/307, 308, 309; 106/3; 438/692, 693; 252/79.1, 79.2; 510/369, 165, 167; 216/96

(56) References Cited

U.S. PATENT DOCUMENTS

| | | | |
|---|---|---|---|
| 5,860,848 A | 1/1999 | Loncki et al. | |
| 6,123,603 A | 9/2000 | Tada et al. | |
| 6,149,696 A | 11/2000 | Jia | |
| 6,355,075 B1 * | 3/2002 | Ina et al. | 51/308 |
| 6,426,155 B1 | 7/2002 | Tada et al. | |
| 6,626,967 B2 * | 9/2003 | Takami et al. | 51/308 |
| 2003/0084815 A1 * | 5/2003 | Ohno et al. | 106/3 |

FOREIGN PATENT DOCUMENTS

| | | |
|---|---|---|
| GB | 2354524 A | 3/2001 |
| GB | 2354769 A | 4/2001 |
| JP | 11167715 A | 6/1999 |
| JP | 11-214338 A | 8/1999 |
| JP | 11246849 A | 9/1999 |
| JP | 2001-294420 A | 10/2001 |
| JP | 2003-89786 A | 3/2003 |

* cited by examiner

*Primary Examiner*—Michael Marcheschi
(74) *Attorney, Agent, or Firm*—Birch, Stewart, Kolasch & Birch, LLP

(57) ABSTRACT

A polishing composition comprising an abrasive, an acid and/or a salt thereof, and water, wherein copper (Cu) is contained in an amount of 1 mg or less per kg of the polishing composition; a process for reducing a surface defect of a substrate comprising applying to a substrate or a polishing pad a polishing composition comprising an abrasive, an acid and/or a salt thereof, and water, wherein copper (Cu) is contained in an amount of 1 mg or less per kg of the polishing composition fed to the substrate or the polishing pad; and a process for manufacturing a substrate comprising a polishing step comprising applying to a substrate or a polishing pad the above polishing composition. The polishing composition of the present invention is used for polishing a substrate for precision parts such as substrates for magnetic recording media such as magnetic disks, optical disks, opto-magnetic disks, and the like; photomask substrates, optical lenses, optical mirrors, optical prisms and semiconductor substrates, concretely polishing a substrate for memory hard disks, and especially finish polishing.

11 Claims, No Drawings

POLISHING COMPOSITION

BACKGROUND OF THE INVENTION

1. Field of the Invention

The present invention relates to a polishing composition, a process for reducing surface defects of a substrate with the polishing composition, and a process for manufacturing a substrate with the polishing composition.

2. Discussion of the Related Art

Recent memory hard disk drives have been demanded to have high areal density and small size. In order to increase the areal density, it has been strongly urged to lower flying height of a magnetic head and to reduce the unit area of recording. Along with this trend, the surface quality required after polishing has become severely assessed every year even in a process for manufacturing a magnetic disk substrate. In order to meet the requirement of lower flying height of the magnetic head, the improvement in surface smoothness and the reduction in surface defects have been desired.

In order to meet such requirements, there have been proposed polishing compositions with improved surface smoothness such as surface roughness Ra and Rmax, scratches, pits and projections (see Japanese Patent Laid-Open No. Hei 11-167715 and Japanese Patent Laid-Open No. Hei 11-246849 (corresponding to U.S. Pat. No. 6,149,696)). However, as a consequence of improved surface smoothness, there have been newly found surface defects such as pits and projections which have not been detected so far. Therefore, the reduction of the generation of such surface defects is a problem to be solved.

SUMMARY OF THE INVENTION

According to the present invention, there are provided:

[1] a polishing composition comprising an abrasive, an acid and/or a salt thereof, and water, wherein copper (Cu) is contained in an amount of 1 mg or less per kg of the polishing composition;

[2] a process for reducing a surface defect of a substrate comprising applying to a substrate or a polishing pad a polishing composition comprising an abrasive, an acid and/or a salt thereof, and water, wherein copper (Cu) is contained in an amount of 1 mg or less per kg of the polishing composition fed to the substrate or the polishing pad; and

[3] a process for manufacturing a substrate comprising a polishing step comprising applying to a substrate or a polishing pad a polishing composition comprising an abrasive, an acid and/or a salt thereof, and water, wherein copper (Cu) is contained in an amount of 1 mg or less per kg of the polishing composition fed to the substrate or the polishing pad.

DETAILED DESCRIPTION OF THE INVENTION

The present invention relates to a polishing composition for polishing a substrate for a memory hard disk, especially for final polishing, which can reduce surface defects such as pits and projections, a process for reducing surface defects of a substrate with the polishing composition, and a process for manufacturing a substrate with the polishing composition.

These and other advantages of the present invention will be apparent from the following description.

One of the great features of the polishing composition of the present invention resides in that the polishing composition comprises an abrasive, an acid and/or a salt thereof, and water, wherein copper (Cu) is contained in an amount of 1 mg or less per kg of the polishing composition. By using the polishing composition of the present invention in which the content of copper is adjusted to equal to or less than a specified amount in the polishing composition which has not been conventionally considered for, for instance, polishing a substrate for a memory hard disk, especially finish polishing, there are exhibited some excellent effects that surface defects such as pits and projections can be reduced.

In the present invention, the content of Cu can be obtained by treating a polishing composition with hydrofluoric acid, nitric acid or the like, removing silica or the like which would hinder the Cu quantification, dissolving Cu, and determining the content of Cu with an inductively coupled plasma mass spectrometer (ICP mass spectrometer). The ICP mass spectrometer includes one commercially available from Seiko Instruments, Inc. under the trade name of "SPQ-8000 (used for high sensitivity)."

The content of Cu is 1 mg/kg or less, preferably 0.5 mg/kg or less, more preferably 0.1 mg/kg or less, still more preferably 0.07 mg/kg or less, still more preferably 0.05 mg/kg or less, still more preferably 0.03 mg/kg or less, still more preferably 0.02 mg/kg or less, of the polishing composition, from the viewpoint of reducing the surface defects of the substrate.

In order to reduce the content of Cu to a level of equal to or less than a specified amount, the content of Cu in each of the raw materials for preparing a polishing composition must be reduced. Those compositions of which contents of Cu are controlled to low concentrations must be selected. It is preferable that the polishing composition is taken measures for removal of Cu in each raw material during the production, purification after the production, and measures for preventing contamination from the production apparatus. For instance, when the colloidal silica is used as an abrasive, the selection of rough stone and purification thereof must be sufficient even in the production of silica cullets which are used as the raw materials therefor, and various measures for preventing the contamination of Cu from the production apparatus to the equipment must be taken.

In addition, in the present invention, it is preferable that the amount of those metal elements other than Cu of which ionization tendency is smaller than that of Ni. The metal elements other than Cu of which ionization tendency is smaller than that of Ni include Sn, Pb, Ag, Pt, Au and the like. Among them, those having smaller contents of Sn and Pb are preferable.

Each of the metal contents of these metal elements other than Cu of which ionization tendency is smaller than that of Ni is preferably 1 mg/kg or less, more preferably 0.5 mg/kg or less, still more preferably 0.1 mg/kg or less, still more preferably 0.07 mg/kg or less, still more preferably 0.05 mg/kg or less, still more preferably 0.03 mg/kg or less, still more preferably 0.02 mg/kg or less, of the polishing composition. Among them, it is most preferable that a total content of Cu and the metal element other than Cu of which ionization tendency is smaller than that of Ni is 1 mg/kg or less.

In the present invention, the above mentioned Cu and the metal element other than Cu of which ionization tendency is smaller than that of Ni (hereinafter collectively and simply referred to as "metal elements") include those existing in all sorts of forms such as metals, inorganic metal salts, organometallic compounds, ions and the like.

These metal elements are brought into the composition system from the abrasives, acids, additives such as oxidizing agents and water mentioned below which constitute the polishing composition, or from the apparatus by which the polishing composition is produced. Therefore, in the polishing composition of the present invention, it is preferable that the content of the metal elements in the polishing composition would not exceed the above range by using components containing smaller amounts of these elements or avoiding the use of a member containing these metal elements in the apparatus by which the polishing composition is prepared. For instance, much care must be paid not to bring in the metal elements, especially copper, from the vessels used for preparation and storage of the polishing composition, and transportation to the composition system, and it is preferable to use a resinous vessel, a metallic container coated or internally bagged with a resin such as polypropylene or polyethylene. The same can be said for the piping for feeding the polishing composition.

As the abrasive used in the present invention, any abrasives generally employed for polishing can be used. The abrasive includes, for instance, metals; carbides of metals or metalloids, nitrides of metals or metalloids, oxides of metals or metalloids, borides of metals or metalloids; diamond, and the like. The elements of the metals or metalloids include those elements belonging to the Group 2A, 2B, 3A, 3B, 4A, 4B, 5A, 6A, 7A or 8 of the Periodic Table (long period form). Concrete examples of the abrasive include aluminum oxide, silicon carbide, diamond, magnesium oxide, zinc oxide, titanium oxide, cerium oxide, zirconium oxide, silica, and the like. It is preferable that one or more of these abrasives are used, from the viewpoint of increasing the polishing rate. Among them, aluminum oxide, silica, cerium oxide, zirconium oxide, titanium oxide, and the like are suitable for polishing semiconductor wafers and semiconductor elements and substrates for precision parts such as substrates for magnetic recording media. As to the aluminum oxide, those having various crystal forms such as $\alpha$, $\theta$ and $\gamma$ have been known, and can be appropriately selected and used depending upon the applications. Moreover, the silica, especially colloidal silica is suitable for an application of final polishing of a memory magnetic disk substrate having high recording density and an application of polishing a semiconductor device substrate, which require a higher level of smoothness.

The abrasive has an average primary particle size of 200 nm or less, and preferably from 10 to 200 nm, more preferably from 20 to 150 nm, especially preferably from 50 to 100 nm, from the viewpoint of increasing the polishing rate. Further, when the primary particles are aggregated to form a secondary particle, the abrasive has an average secondary particle size of preferably from 50 to 3000 nm, more preferably from 100 to 1500 nm, especially preferably from 200 to 1200 nm, from the viewpoint of similarly increasing the polishing rate and from the viewpoint of reducing the surface roughness of an object to be polished. The average primary particle size of the abrasive can be obtained by carrying out image analysis by observation with a scanning electron microscope or transmission electron microscope (magnification: preferably from 3000 to 500000 times), and determining an arithmetic means of major axis length and minor axis length of the particle. In addition, the average secondary particle size can be determined as a volume-average particle size by using a laser beam diffraction method.

In addition, in the present invention, it is more preferable to use silica particles as the abrasive, from the viewpoints of reducing the surface roughness (Ra, Rmax) and the waviness (Wa), and reducing the surface defects such as scratches, thereby improving the surface quality. The silica particles include colloidal silica particles, fumed silica particles, surface-modified silica particles, and the like, among which the colloidal silica particles are preferable. Here, the colloidal silica particles can be obtained by, for instance, a process comprising generating silica particles from an aqueous silicic acid.

The silica particles have an average primary particle size of preferably 1 nm or more, more preferably 10 nm or more, still more preferably 20 nm or more, from the viewpoint of increasing the polishing rate, and is preferably 200 nm or less, more preferably 150 nm or less, still more preferably 120 nm or less, especially preferably 100 nm or less, from the viewpoint of reducing the surface roughness (Ra, Rmax) and waviness (Wa). The silica particles have an average primary particle size of preferably from 1 to 200 nm, more preferably from 1 to 150 nm, still more preferably from 10 to 120 nm, especially preferably from 20 to 100 nm. The particle size of the silica particles can be obtained by carrying out image analysis by observation with a transmission electron microscope (magnification: preferably from 3000 to 500000 times), and determining an arithmetic means of major axis length and minor axis length of the particle.

In addition, it is preferable that the silica particles have a particle size distribution such that its particle size at 50% counted from a smaller size side on a number base (D50) in a cumulative particle size distribution is preferably from 10 to 200 nm, more preferably from 20 to 150 nm, still more preferably from 30 to 120 nm, from the viewpoint of achieving an economical polishing rate and from the viewpoint of having excellent surface smoothness, thereby achieving excellent surface quality without generating surface defects.

In the present invention, by using the polishing composition comprising silica particles having the particle size distribution shown above, there are exhibited such effects that the surface roughness of the polished substrate is made small after polishing, and that the substrate to be polished can be polished at an economical speed without generating surface defects such as projections and polishing damages.

The content of the abrasive is preferably 0.5% by weight or more, more preferably 1% by weight or more, still more preferably 3% by weight or more, especially preferably 5% by weight or more, of the polishing composition, from the viewpoint of increasing the polishing rate, and the content of the abrasive is preferably 20% by weight or less, more preferably 15% by weight or less, still more preferably 13% by weight or less, especially preferably 10% by weight or less, of the polishing composition, from the viewpoint of improving the surface quality and from the viewpoint of economic advantages.

In other words, the content is preferably from 0.5 to 20% by weight, more preferably from 1 to 15% by weight, still more preferably from 3 to 13% by weight, especially preferably from 5 to 10% by weight.

As the acid used in the present invention, those compounds having a pK1 of 7 or less are preferable. It is desired that the compound has a pK1 of 3 or less, more preferably 2.5 or less, still more preferably 2 or less, especially preferably 1.5 or less, most preferably having such strong acidity which cannot be expressed by pK1, from the viewpoint of reducing fine scratches. Examples thereof include nitric acid, sulfuric acid, sulfurous acid, persulfuric acid, hydrochloric acid, perchloric acid, phosphoric acid, phosphonic acid, phosphinic acid, pyrophosphoric acid, oxalic acid, amide sulfuric acid, aspartic acid, 2-aminoethylphosphonic acid, glutamic acid, picolinic acid and the like. Among them, nitric acid, sulfuric acid, hydrochloric acid and perchloric acid are preferable, from the viewpoint of reducing fine scratches. These acids can be used alone or in admixture of two or more kinds. Here, pK1 is defined as follows: A logarithmic value of an inverse of an acid dissociation constant (at 25° C.) of an organic compound or an inorganic compound is usually expressed as pKa, and a logarithmic value of an inverse of a first acid dissociation constant is defined as pK1. The pK1 of each compound is listed in, for instance, in *Kagaku Binran* (*Kiso-hen*) II, Fourth Revision, pp. 316–325 (Edit. by Nippon Kagakukai), and the like. In the present invention, it is especially preferable to use those acids having pK1 of 2 or less, from the viewpoint of satisfying both reduction of fine scratches and increase in the polishing rate.

In addition, in the present invention, salts of the above-mentioned acids can be used in place of the acids. The counter ions for the salt include those metal elements having an ionization tendency larger than that of Ni, ammonium ion and the like, among which sodium ion, nickel ion, potassium ion, iron ion, ammonium ion and the like are preferable.

The content of the acid and a salt thereof is preferably from 0.0001 to 5% by weight, more preferably from 0.0003 to 3% by weight, still more preferably from 0.001 to 2% by weight, especially preferably from 0.0025 to 1% by weight, of the polishing composition, from the viewpoint of exhibiting sufficient polishing rate and from the viewpoint of improving the surface quality.

In addition, there can be added other component to the polishing composition of the present invention as occasion demands. It is preferable that an oxidizing agent is formulated as other component in the polishing composition, from the viewpoint of increasing the polishing rate. The other component includes thickeners, dispersing agents, anticorrosive agents, basic substances, surfactants, and the like.

The oxidizing agent used in the present invention includes peroxides, permanganic acid or salts thereof, chromic acid or salts thereof, nitric acid or salts thereof, peroxo acid or salts thereof, oxyacid or salts thereof, metal salts, sulfuric acid, and the like.

The above-mentioned peroxide includes hydrogen peroxide, sodium peroxide, barium peroxide, and the like; the permanganic acid or salts thereof include potassium permanganate, and the like; the chromic acid or salts thereof include metal salts of chromic acid, metal salts of dichromic acid, and the like; the nitric acid or salts thereof include iron (III) nitrate, ammonium nitrate, and the like; the peroxo acid or salts thereof include peroxodisulfuric acid, ammonium peroxodisulfate, metal salts of peroxodisulfuric acid, peroxophosphoric acid, peroxosulfuric acid, sodium peroxoborate, performic acid, peracetic acid, perbenzoic acid, perphthalic acid, and the like; oxyacid or salts thereof include hypochlorous acid, hypobromous acid, hypoiodous acid, chloric acid, bromic acid, iodic acid, sodium hypochlorate, calcium hypochlorate, and the like; metal salts include iron (III) chloride, iron (III) sulfate, iron (III) citrate, ammonium iron (III) sulfate, and the like. The preferred oxidizing agent is hydrogen peroxide, iron (III) nitrate, peracetic acid, ammonium peroxodisulfate, iron (III) sulfate, ammonium iron (III) sulfate and the like. Especially, hydrogen peroxide is preferable, from the viewpoints of being widely used without depositing metal ions to the surface of the substrate and being inexpensive. These oxidizing agents can be used alone or in admixture of two or more kinds.

The content of the oxidizing agent is preferably 0.002% by weight or more, more preferably 0.005% by weight or more, still more preferably 0.007% by weight or more, especially preferably 0.01% by weight or more, of the polishing composition, from the viewpoint of increasing the polishing rate. Also, the content is preferably 20% by weight or less, more preferably 15% by weight or less, still more preferably 10% by weight or less, especially preferably 5% by weight or less, of the polishing composition, from the viewpoints of reducing the surface roughness and the waviness, and reducing the surface defects such as pits and scratches, thereby improving the surface quality, and from the viewpoint of economic advantages. The content is preferably from 0.002 to 20% by weight, more preferably from 0.005 to 15% by weight, still more preferably from 0.007 to 10% by weight, especially preferably from 0.01 to 5% by weight, of the polishing composition.

Water in the polishing composition of the present invention is used as a medium. From the viewpoint of efficiently polishing the object to be polished, the water content is preferably 55% by weight or more, more preferably 67% by weight or more, still more preferably 75% by weight or more, especially preferably 84% by weight or more, of the polishing composition, and the water content is preferably 99.4999% by weight or less, more preferably 98.9947% by weight or less, still more preferably 96.992% by weight or less, especially preferably 94.9875% by weight or less, of the polishing composition. The water content is preferably from 55 to 99.4999% by weight, more preferably from 67 to 98.9947% by weight, still more preferably from 75 to 96.992% by weight, especially preferably from 84 to 94.9875% by weight.

The concentration of each component of the above-mentioned polishing composition may be any of the concentration during the preparation of the composition and the concentration upon use. In many cases, the polishing composition is usually prepared as a concentrate, which is diluted upon use.

The polishing composition of the present invention can be prepared by mixing an abrasive, an acid and/or a salt thereof, and water, and other components such as an oxidizing agent as occasion demands by a known method.

It is preferable that the pH of the polishing composition of the present invention is appropriately determined depending upon the kinds of the objects to be polished and the required properties. Although the pH of the polishing composition cannot be absolutely determined because it differs depending upon the materials of the objects to be polished, it is desirable that the pH generally in metal materials is acidic, preferably less than 7.0, more preferably 6.0 or less, still more preferably 5.0 or less, especially preferably 4.0 or less, from the viewpoint of increasing the polishing rate. In addition, the pH is preferably 1.0 or more, more preferably 1.2 or more, still more preferably 1.4 or more, especially preferably 1.6 or more, from the viewpoints of influence to a human body and corrosivity of the machine. Especially in the substrate for precision parts mainly made of a metal such as an aluminum alloy substrate manufactured by nickel-phosphorus (Ni-P) plating, it is preferable that the pH shows acidic, and that the pH is preferably 4.5 or less, more preferably 4.0 or less, still more preferably 3.5 or less, especially preferably 3.0 or less, from the viewpoint of increasing the polishing rate. Therefore, although the pH may be set in accordance with the purpose which is to be considered important, especially in the substrate for precision parts mainly made of a metal such as an aluminum alloy substrate manufactured by Ni—P plating, the pH is preferably from 1.0 to 4.5, more preferably from 1.2 to 4.0, still more preferably from 1.4 to 3.5, especially preferably from 1.6 to 3.0, from the total viewpoints mentioned above. The pH can be adjusted by properly adding an inorganic acid such as nitric acid or sulfuric acid, an organic acid such as oxalic acid, an ammonium salt, a basic substance such as an aqueous ammonia, potassium hydroxide, sodium hydroxide or an amine in a desired amount.

In addition, the polishing composition of the present invention having the above constitution can exhibit high polishing rate by reducing the generation of surface defects of the substrate by employing a known polishing process. In this case, the polishing composition of the present invention itself can be used, or a the polishing composition of which each component is mixed so as to give the composition of the present invention may be used.

The material for the object to be polished by the polishing composition of the present invention includes, for instance, metals or metalloids such as silicon, aluminum, nickel, tungsten, copper, tantalum and titanium, and alloys thereof; glassy substances such as glass, glassy carbon and amorphous carbons; ceramic materials such as alumina, silicon dioxide, silicon nitride, tantalum nitride, and titanium carbide; resins such as polyimide resins; and the like. Among them, an object to be polished is preferably made of a metal such as aluminum, nickel, tungsten or copper, or made of an alloy containing these metals as the main components; or an object to be polished preferably contains these metals as in semiconductor substrates made of semiconductive elements. The aluminum alloy substrate plated with Ni—P is especially preferable.

The shape for the object to be polished is not particularly limited. For instance, those having shapes containing planar portions such as discs, plates, slabs and prisms, or shapes containing curved portions such as lenses can be subjects for polishing with the polishing composition of the present invention. Among them, the disc-shaped objects to be polished are especially preferable in polishing.

The polishing composition of the present invention can be favorably used in polishing the substrate for precision parts. For instance, the polishing composition is suitable for polishing substrates for precision parts such as substrates for magnetic recording media such as magnetic disks, optical disks, opto-magnetic disks, and the like; photomask substrates, optical lenses, optical mirrors, optical prisms and semiconductor substrates. The polishing of the semiconductor substrates comprises the steps of polishing a silicon wafer (bare wafer), forming separation film for an embedding element, subjecting a dielectric film to planarization, forming an embedded metal line, and forming embedded capacitor, and the like. The polishing composition of the present invention is particularly suitable for polishing a magnetic disk substrate, especially a magnetic disk substrate having Ni element on a surface thereof. The magnetic disk substrate includes a magnetic disk substrate plated with Ni—P or the like. Furthermore, the polishing composition of the present invention is suitable for finish polishing of the above-mentioned substrate for magnetic disk.

The polishing process for a substrate to be polished with the polishing composition of the present invention includes a process of polishing an object to be polished, comprising, for instance, diluting a polishing composition, thereafter clamping a substrate with an abrasive disk attached to an abrasive cloth such as an organic polymer-based nonwoven fabric, feeding a polishing liquid diluted above to a surface of the object to be polished by pumping up the polishing liquid with a pump or the like through a pipe, and moving the abrasive disk or the substrate with applying a given pressure. In this process, as the vessel for diluting a polishing liquid and the member to be contacted with the polishing liquid such as a tank, a pipe or a pump, there can be preferably used a member made of a metal coated with a resin coated with Teflon® (trade name, polytetrafluoroethylene), or a member made of a resin such as polysilicone, in order to avoid admixing of a metal element, especially copper. Accordingly, the polishing process is a process comprising applying to a substrate or a polishing pad a polishing composition comprising an abrasive, an acid and/or a salt thereof, and water, wherein copper (Cu) is contained in an amount of 1 mg or less per kg of the polishing composition fed to the substrate or the polishing pad. By using the polishing process, the generation of the surface defects such as pits and projections can be more effectively suppressed, and the polishing rate can be increased. In other words, the above-mentioned polishing process is a process for reducing the surface defects of the substrate.

The process for manufacturing a substrate of the present invention comprises polishing a substrate to be polished with the above-mentioned polishing composition. The polishing step employed in this method may be the above polishing process. Concrete example of the polishing step includes a polishing step comprising applying to a substrate or a polishing pad a polishing composition comprising an abrasive, an acid and/or a salt thereof, and water, wherein copper (Cu) is contained in an amount of 1 mg or less per kg of the polishing composition fed to the substrate or the polishing pad. In the process, it is preferable that the polishing step is carried out in a second step or subsequent steps among the plural polishing steps, and it is especially preferable that the polishing method is carried out in the final polishing step. Especially, it is preferable in the process for manufacturing a substrate of the present invention that the above-mentioned polishing composition is used in the finishing step for surface polishing among the polishing steps from the viewpoints of causing little corrosion of the substrate and being less likely to generate surface defects.

The manufactured substrate is excellent in surface smoothness in addition to the reduction in the surface defects such as pits and projections.

As described above, a high-quality substrate with reduced surface defects such as pits and projections can be manufactured with high production efficiency by controlling the content of copper to 1 mg or less per kg of the polishing composition when the polishing composition is fed to the substrate or polishing pad.

The polishing composition of the present invention is especially effective in the polishing method, and the polishing composition can be similarly applied to polishing steps other than the polishing method, for instance, lapping method, and the like.

EXAMPLES (Object to Be Polished)

Each of the resulting polishing compositions was evaluated for its polishing properties by using an Ni—P plated, aluminum alloy substrate which was previously roughly polished with a polishing liquid containing alumina abrasives so that the substrate had a surface roughness Ra of 1 nm, a thickness of 0.8 mm, and a diameter of 95 mm as a substrate to be polished. The substrate is hereinafter referred to as an "Ni—P plated substrate to be polished."

Examples 1 to 8 and Comparative Example 1 to 4

A 10 L polyethylene tank was charged with given amounts as shown in Table 1 of a colloidal silica A [average particle size (D50): 30 nm, $SiO_2$ concentration: 40% by weight, copper content: 30 μg/kg] or a colloidal silica B [average particle size (D50): 50 nm, $SiO_2$ concentration: 30% by weight, copper content: 100 μg/kg], sulfuric acid or a sulfate, a 35% by weight aqueous hydrogen peroxide, 60% by weight 1-hydroxyethylidene-1,1-diphosphonic acid, and ion-exchanged water with mixing, to give a polishing composition having a pH of 2 with different copper contents. Here, the contents of each component of the polishing composition, in addition to those listed in Table 1, were as follows: 0.3% by weight of aqueous hydrogen peroxide, 0.5% by weight of 1-hydroxyethylidene-1,1-diphosphonic acid, and balance water.

In addition, the copper contents in the polishing composition and in the polishing composition collected immediately before feeding the polishing composition to the substrate to be polished were determined by treating the polishing composition with hydrofluoric acid and nitric acid, removing silica or the like which would hinder the Cu quantification, dissolving Cu, and quantifying the amount with an inductively coupled plasma mass spectrometer (ICP mass spectrometer, commercially available from Seiko Instruments, Inc. under the trade name of SPQ-8000 (used for high sensitivity)).

Five-hundred grams of the resulting polishing composition and one piece of the Ni—P plated substrate to be polished were placed in a plastic (low-density polyethylene) bag with a zipper (25 cm×15 cm), and the bag was degassed. The substrate was allowed to stand in the bag with heating to 35° C., and taken out from the bag one day after and five days after to determine a weight change of the substrate. At the same time, the surface conditions were observed and evaluated in accordance with the following criteria. The results are shown in Table 1. The observation of the substrate was carried out by visually observing a substrate surface using a high-intensity halogen lamp.

Evaluation Criteria:

⊚: those keeping the gloss;
○: those with slight reduction in gloss;
Δ: those with little gloss and slight whitening; and
x: those turned white.

In the present invention, those evaluated as ⊚, ○ and Δ are acceptable products.

TABLE 1

| | Colloidal Silica (Content)[1] | Sulfuric Acid or Sulfate (Content) | Copper Content[4] (mg/kg) | Substrate After One Day Weight Loss (mg) | Observation | Substrate After Five Days Weight Loss (mg) | Observation |
|---|---|---|---|---|---|---|---|
| Ex. 1 | A (7%) | — | 0.008 | 0.03 | ⊚ | 0.08 | ○ |
| Ex. 2 | B (7%) | — | 0.03 | 0.04 | ○ | 0.14 | Δ |
| Ex. 3 | A (7%) | Sulfuric Acid (2 mg/kg) | 0.008 | 0.03 | ⊚ | 0.08 | ○ |
| Ex. 4 | A (7%) | Sodium Sulfate (2 mg/kg) | 0.008 | 0.03 | ⊚ | 0.09 | ○ |
| Ex. 5 | A (7%) | Nickel Sulfate[2] (6 mg/kg) | 0.008 | 0.03 | ⊚ | 0.08 | ○ |
| Ex. 6 | A (7%) | Copper Sulfate[3] (0.05 mg/kg) | 0.016 | — | — | 0.11 | ○ |
| Ex. 7 | A (7%) | Copper Sulfate (0.2 mg/kg) | 0.06 | — | — | 0.15 | Δ |
| Ex. 8 | A (7%) | Copper Sulfate (0.6 mg/kg) | 0.15 | — | — | 0.16 | Δ |
| Comp. Ex. 1 | A (7%) | Copper Sulfate (5.6 mg/kg) | 1.4 | 0.07 | Δ | 0.19 | X |
| Comp. Ex. 2 | A (7%) | Copper Sulfate (20 mg/kg) | 5 | — | — | 0.20 | X |
| Comp. Ex. 3 | A (7%) | Copper Sulfate (200 mg/kg) | 50 | — | — | 0.21 | X |
| Comp. Ex. 4 | A (7%) | Copper Sulfate (2000 mg/kg) | 500 | — | — | 0.22 | X |

Remarks
[1] The content of colloidal silica is expressed as % by weight in the polishing composition.
[2] NickelSulfate: nickel sulfate•hexahydrate
[3] CopperSulfate: copper sulfate•hexahydrate
[4] Copper contents in the polishing composition in the polyethylene tank immediately after preparation. The copper contents in the polishing composition immediately after feeding to a substrate to be polished in Examples 1 and 3 were the same as that of the polishing composition in the polyethylene tank.

Examples 9 and 10 and Comparative Examples 5 and 6

An Ni—P plated substrate to be polished was polished with each of the polishing compositions of Examples 1 and 2 and Comparative Examples 1 and 2 under the setting conditions for the double-sided processing machine given below, and thereafter cleaned and polished with the following cleaning device, to give an object to be polished made of an Ni—P plated aluminum alloy substrate to be used as a substrate for a magnetic recording medium.

The polishing conditions are given below.
<Set Conditions for Polishing Conditions>
Polishing testing machine: double-sided processing machine, Model 9B,
manufactured by SPEEDFAM CO., LTD.
Processing pressure: 8 kPa
Polishing pad: "Bellatrix N0058" (manufactured by Kanebo, LTD.).
Disc rotational speed: 30 r/min
Feeding amount for a polishing composition: 30 ml/min
Polishing time period: 5 minutes
Number of substrates introduced: 10

The polishing composition was fed to the substrate to be polished from the polyethylene tank with a tube pump via a polysilicone tube.
<Cleaning Device>
The substrate was scrub-cleaned twice using a product commercially available from Hitachi Electronics Engineering Co., Ltd. under the trade name of "SCRUBBER SS-5250-05" for a cleaning time of 10 seconds, and thereafter subjected to centrifugal drying in ion-exchanged water at 60° C.

Each of the cleaned substrates was observed for minimum projections or complicated pits on its surface with a differential interference microscope (objective lens: 50 times, monitor magnification: 28 times, actual magnification: 1400 times), and evaluated according to the following method. The results are shown in Table 2.

Method for Evaluating Pits and Fine Projections on Substrate Surface

Five polished substrates were taken and observed in all of X and Y orientations for front and back sides of each substrate, a total of 10 sides, and the number of pits and fine projections was counted as X-Y observation number per one side and averaged, and the evaluation was made in accordance with the following criteria:

Evaluation Criteria:

⊚: those having pits and projections of 0.3 or less;

○: those having pits and projections of exceeding 0.3 and 1 or less;

Δ: those having pits and projections of exceeding 1 and 10 or less; and x: those having pits and projections of exceeding 10.

In the present invention, those evaluated as ⊚ and ○ are acceptable products.

TABLE 2

|  | Pits and Fine Projections on Substrate Surface |
| --- | --- |
| Ex. 9 | ⊚ |
| Ex. 10 | ○ |
| Comp. Ex. 5 | x |
| Comp. Ex. 6 | x |

It can be seen from the results shown in Table 1 that in each of the polishing compositions obtained in Examples 1 to 8, there is a smaller reduction in the weight of the substrate (amount of corrosion) so that the gloss is well maintained in the substrate and very little surface defects are generated in the substrate, as compared to the polishing compositions obtained in Comparative Example 1 to 4 containing a large amount of copper.

In addition, it can be seen from the results of Table 2 that in Example 9 and 10 in which a polishing composition with a lower copper content is used, surface defects such as pits and fine projections are significantly reduced as compared to those of Comparative Examples 5 and 6 in which a polishing composition with a higher copper content is used.

Since the polishing composition of the present invention is used for polishing a substrate for precision parts, concretely polishing a substrate for memory hard disks, and especially finish polishing, there is exhibited an effect that a substrate with reduced pits and projections can be obtained.

What is claimed is:

1. A process for reducing a surface defect of a magnetic disk substrate comprising applying to a magnetic disk substrate or a polishing pad a polishing composition comprising an abrasive, an acid and/or a salt thereof, and water, wherein copper (Cu) is contained in an amount of 1 mg or less per kg of the polishing composition fed to the substrate or the polishing pad, wherein a pH of the polishing composition is 4.0 or less.

2. A process for reducing a surface defect of a magnetic disk substrate comprising applying to a magnetic disk substrate or a polishing pad a polishing composition comprising an abrasive, an acid and/or a salt thereof, and water, wherein copper (Cu) is contained in an amount of 1 mg or less per kg of the polishing composition fed to the substrate or the polishing pad, wherein a pH of the polishing composition is 4.0 or less and wherein prior to or during applying the polishing composition to the magnetic disk substrate or the polishing pad, the polishing composition is in contact with a member that is made of a metal coated with a resin or that is made of a resin.

3. A process for manufacturing a magnetic disk substrate comprising a polishing step comprising applying to a magnetic disk substrate or a polishing pad a polishing composition comprising an abrasive, an acid and/or a salt thereof, and water, wherein copper (Cu) is contained in an amount of 1 mg or less per kg of the polishing composition fed to the substrate or the polishing pad, wherein a pH of the polishing composition is 4.0 or less.

4. The process according to claim 1, wherein the abrasive comprises silica particles and a content of the abrasive is 1 to 15% by weight.

5. The process according to claim 1, wherein copper (Cu) is contained in an amount of 0.07 mg or less per kg of the polishing composition.

6. The process according to claim 1, wherein said magnetic disk substrate having has Ni element on a surface thereof.

7. The process according to claim 2, wherein said magnetic disk substrate having has Ni element on a surface thereof.

8. The process according to claim 3, wherein the abrasive comprises silica particles and a content of the abrasive is 1 to 15% by weight.

9. The process according to claim 3, wherein copper (Cu) is contained in an amount of 0.07 mg or less per kg of the polishing composition.

10. The process according to claim 3, wherein prior to or during applying the polishing composition to the magnetic disk substrate or the polishing pad, the polishing composition is in contact with a member that is made of a metal coated with a resin or that is made of a resin.

11. The process according to claim 3, wherein said magnetic disk substrate having has Ni element on a surface thereof.

* * * * *